United States Patent [19]

Sato

[11] 4,342,088
[45] Jul. 27, 1982

[54] MULTIFARIOUS BORING DEVICE
[75] Inventor: Hiroshi Sato, Fujisawa, Japan
[73] Assignee: Daiichi Electric Co. Ltd., Kanagawa, Japan
[21] Appl. No.: 132,164
[22] Filed: Mar. 20, 1980
[30] Foreign Application Priority Data Mar. 27, 1979 [JP] Japan .................................. 54-35106

[51] Int. Cl.³ ...................... G06F 15/20; B23B 39/16; B23B 39/24
[52] U.S. Cl. .................................... 364/474; 408/33; 408/44; 408/50
[58] Field of Search .................. 364/474, 475; 408/33, 408/34, 35, 36, 40, 43, 44, 50, 70

[56] References Cited
U.S. PATENT DOCUMENTS

| | | | |
|---|---|---|---|
| 3,832,083 | 8/1974 | Dockery et al. ................. | 480/70 X |
| 3,909,923 | 10/1975 | Kurimoto et al. ................ | 408/35 X |
| 3,975,109 | 8/1976 | Frazierr ................................. | 408/35 |
| 4,041,588 | 8/1977 | Kuhnert ............................ | 408/35 X |
| 4,068,297 | 1/1978 | Komiya ........................... | 364/474 X |
| 4,182,205 | 1/1980 | Baker ................................ | 408/43 X |
| 4,204,304 | 5/1980 | Eidam ................................... | 408/35 |

FOREIGN PATENT DOCUMENTS 1437794 6/1976 United Kingdom ................ 364/474

OTHER PUBLICATIONS

Sperry Rand UMAC-6 Numerical Control Applications, Nov. 1978.

Primary Examiner—Felix D. Gruber
Attorney, Agent, or Firm—Wenderoth, Lind & Ponack

[57] ABSTRACT

A multifarious boring device includes a work table and a head with a variety of machine tools or cutters. The work table and the head are controlled by a computer through a shifting device and a power device. The computer computes distances and directions between the cutters and working points on a workpiece on the work table. Thereby, the shifting means controlled by the computer shifts the work table having the worked material thereon. The power device controlled by the computer powers one of the cutters. Codes of the type of holes and working points are fed into the computer. Thereby, a desired hole can be made at a desired point on the workpiece, and different patterns can be made in different types of workpieces.

10 Claims, 5 Drawing Figures

MULTIFARIOUS BORING DEVICE

BACKGROUND OF THE INVENTION

The present invention relates generally to machine tools and more particularly to devices that are capable of making a variety of holes, cuts, etc., in different patterns, in various materials; to be worked.

Furthermore, the present invention provides a device which makes a hole, cut, etc. precisely at a desired point on a material workpiece with a cutter chosen from a plurality of cutters of a head.

Still further, the present invention provides a device which rapidly makes a desired hole, cut, etc. at a desired point in a material workpiece without having to change the cutter each time a new desired cutter is required, thereby saving labor.

Moreover, the present invention provides a device which operates with cutters or machine tools, for example with a set of a variety of drills, punches, screw taps, dies, etc., and the device can make the same type of machining operations and also can make different types of machining operations.

The present invention provides devices which can be used in a variety of fields since the cutters are not limited to just drills, punches, screw taps and/or dies. The term "boring" device does not mean to limit the cutters to just boring operations.

Still further, the present invention also provides devices which can be used in a variety of fields, since the material of the workpiece.

The present invention also provides a NC (numerical control) boring device for a workpiece.

In the operation of an ordinary boring device such as a drilling machine, tapping machine or the like, it is necessary to change cutters whenever a different operation is required. For example, a drill, screw tap, punch or so on must be exchanged by hand for a different suitable tool whenever a different machine operation is required. Changing a tool by hand requires a considerable amount of time compared to the time, required for the actual machining operation, and therefore is inefficient, especially in the case of a punching operation.

The present invention has solved these problems. This is accomplished by using a head having a set of a variety of machine tools or cutters, as well as a computer which computes distances and directions between the cutters and desired working points on a material workpiece. Then a shifting means moves the workpiece to bring a desired point thereon precisely beneath a particular cutter. Finally, a power means is activated so that the particular cutter performs a machining operation at precisely the desired point.

Consequently, there is no need to replace a cutter each time a different cutter is required. This saves labor and time and is thus more efficient. Especially when an NC boring device is used for working on a PC board, the present invention is very efficient, as illustrated in the following preferred embodiment.

Still further, another type of multifarious boring device is provided according to the present invention, wherein the device makes the same patterns of holes in consecutive material workpieces.

SUMMARY OF THE INVENTION

According to the invention there is provided a multifarious boring device including a head having on a bottom face thereof a variety of cutters or machine tools such as drills, screw taps, punches, dies, etc. The head and a work table are controlled, through a power means and a shifting means, respectively, by a computer such as a minicomputer, microcomputer or calculator which computes distances and directions between the tools and desired points on a workpiece on the work table where the tools are to operate. Upon command from the computer, the shifting means shifts the work table so that a desired working point is precisely beneath a desired tool. The power means then operates the desired tool to perform a machining operation precisely at the desired point.

The boring device can make a variety of patterns precisely on each workpiece without having to change tools whenever a different type of operation is desired.

DESCRIPTION OF THE PREFERRED EMBODIMENT

A multifarious boring device of the present invention will now be described with reference to the attached drawings.

Figure 1:
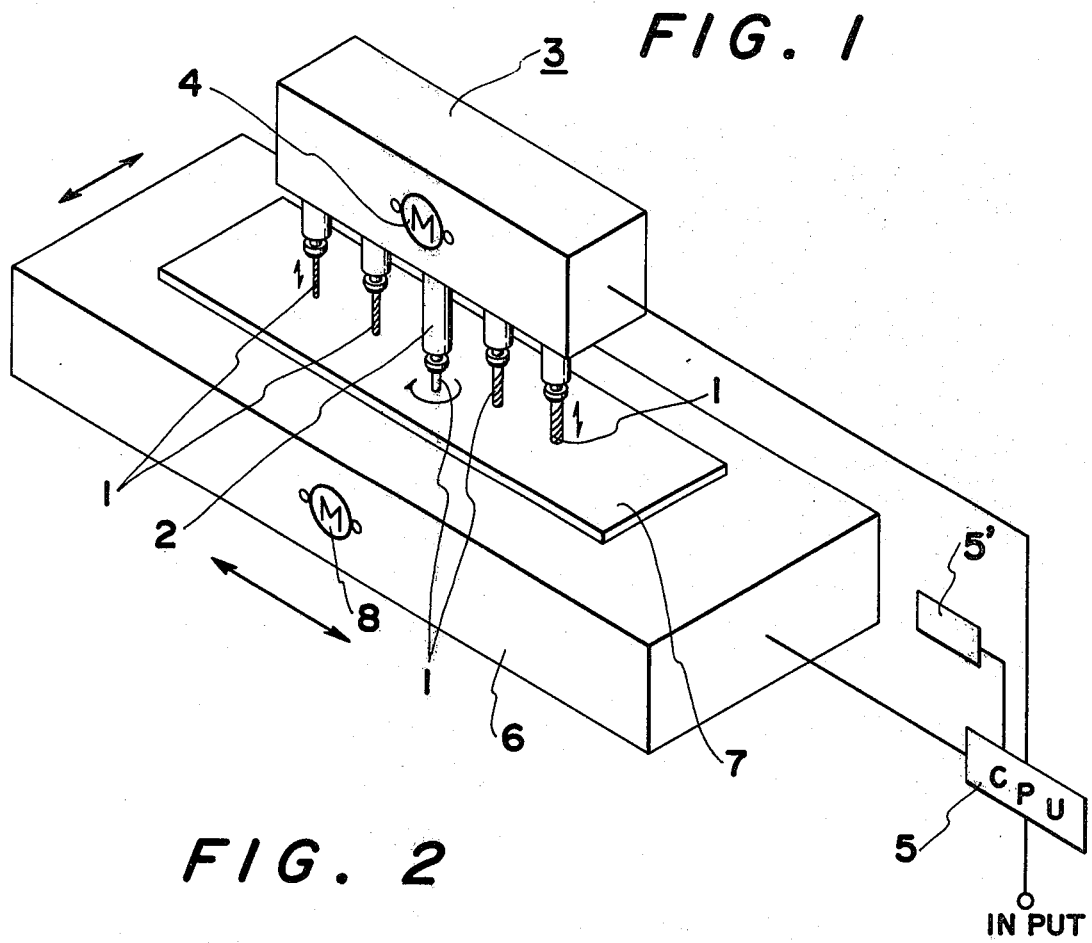
FIG. 1 is a perspective view of a schematic block diagram of a device according to the present invention.

Referring now to FIG. 1 there is illustrated therein a multifarious boring device which is constructed according to the teachings of the present invention. As shown, a head 3 includes spindles 2 respectively having a set of cutters or drills 1. Drills 1 are all of different diameter. Head 3 has a power means such as an electric motor 4 which operates spindles 2 and which is controlled by a computer such as a minicomputer, microcomputer or calculator composed of CPU 5 and a memory 5'. A material workpiece or PC board 7 is put on a work table 6, and a shifting means such as an electric motor 8 moves work table 6 and is controlled by computer 5 with respect to drills 2, and shifts the work table in any horizontal direction.

For example, when five holes are to be drilled, the operation is carried out as follows.

Figure 2:
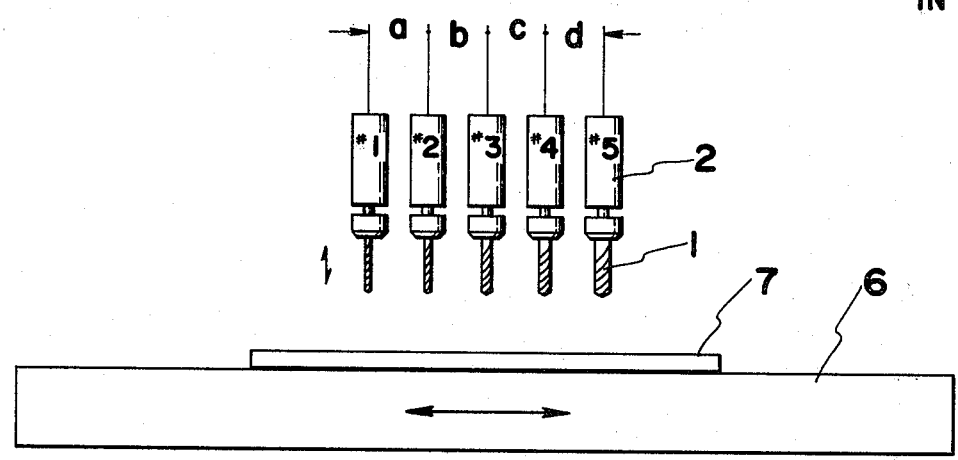
FIG. 2 is an elevation view illustrating exemplary positions of drills of the device in FIG. 1.

A row of spindles 2 are fixedly spaced at 50 cm intervals from each other as represented by a, b, c and d as shown in FIG. 2. Each spindle 2 has a drill 1 of different diameter respectively placed therein. The position of one of the spindles 2 is marked as #3. This spindle is a base spindle and positioned as the basis of computation of the other spindles 2.

Figure 3:
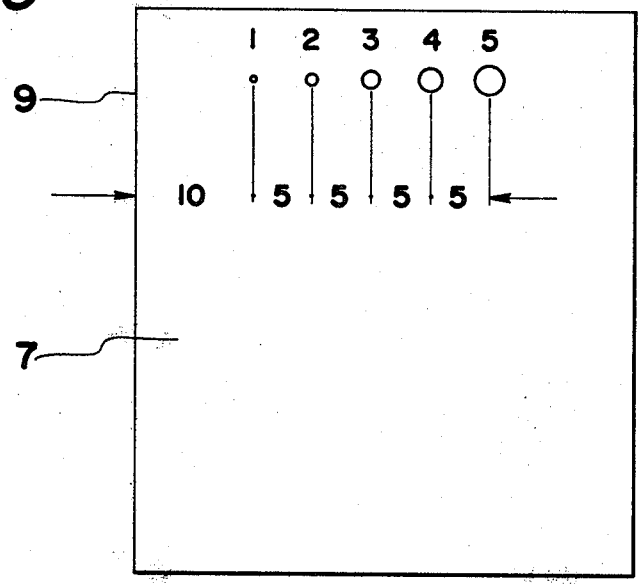
FIG. 3 is a plan view of exemplary holes to be drilled.

When holes as shown in FIG. 3 are to be drilled, first spindle #3 is set over the edge or start line 9 of PC board 7. Distances between spindle #3 and the other spindles 2 are stored in memory 5'. Then the codes "10 mm" and "drill #1" are fed into CPU 5, since the first hole is to be spaced 10 mm from start line 9 on board 7 and, the desired diameter of the first hole is that of drill #1.

CPU 5 computes with memory 5' that $(a+b)+10$ mm $=110$ mm as $a=50$ mm and $b=50$ mm, and commands motor 8 to shift work table 6 to the left by 110 mm. The work table is thus shifted, and PC board 7 is also shifted as it is secured to work table 6. Consequently, the desired working point on PC board 7 is precisely positioned beneath drill #1. Finally drill #1 bores the first hole when motor 4 is activated by commands from CPU 5.

The second hole is to be at a space of 15 mm from start line 9 (see FIG. 3). The desired location of the hole is also at a space of 65 mm from spindle #3 (b+15 mm=65 mm), when the spindle #3 is over start line 9. However work table 6 has already shifted to the left by 110 mm from the first position. Therefore, when codes "15 mm" and "drill #2" are fed into CPU 5, it computes that b+15 mm=65 mm as b=50 mm, then computes that 65 mm−110 mm=45 mm, and it commands motor 8 to shift work table 6 to the right by 45 mm, whereat the second hole is drilled.

The other holes are drilled in the same way. Thus, any desired hole can be made at any desired position.

Figure 4:
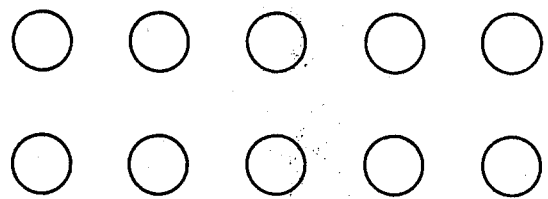
FIGS. 4 and 5 are schematic representations of other examples of positions of cutters or machine tools.
Figure 5:
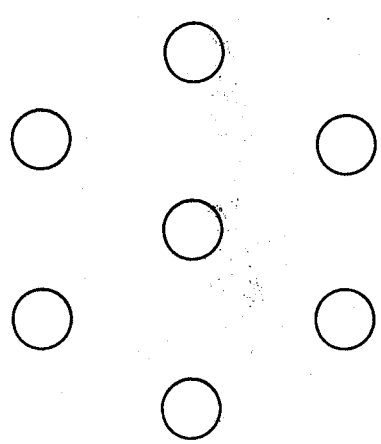

In this case, the holes are made from the left to the right. However, any direction is possible as well as shifting back. It is also possible to operate in a zig-zag formation. Relative positions of the spindles 2 are not limited to the row configuration shown in FIG. 2. More than one row of spindles may be provided as shown in FIG. 4 so that many types of drills can be used. Also, the invention is not limited to a row or rows type configuration. Any configuration such as a circle or circles is possible. This is because a computer or digital logic circuit can compute directions and distances between drills and holes. A circle type of configuration is shown in FIG. 5. Positions of the drills are memorized by memory 5'.

If positions and diameters of holes are programed into a tape, disc or so on, CPU 5 will read the program and automatically control the device of the invention to save much labor and time.

The above described device is just one embodiment of the present invention. It is possible to apply the principle of the invention to other embodiments. For example, it is possible to use punches, screw taps, dies, etc. as cutters instead of a set of drills. It is also possible to make the spindles such that the cutters secured thereto can be easily changed to other types so that the device can be used for special fields.

Thus, the present invention may be employed on devices such as milling machines, NC drilling machines, etc., and the invention may be employed for operating on different workpieces such as PC boards, meshes, metal sheets, ingots, etc. The present invention includes any multifarious boring device which is basicaly composed of a head with cutters of different diameters, shapes, types, etc., a computer with the positions and distances of each cutter memorized, the computer computing the position and the type of a hole desired, a shifting means controlled by the computer which shifts a workpiece such as a PC board, the shifting means including a power means, and another power means which operates the cutters and which is also controlled by the computer. The computer, of course, has input means where codes of desired holes are fed and can be programmed to make holes at any desired points. The shifting means can be used to shift the head instead of the work table. The workpiece is secured to a as work table by a clamp or any means to secure the worked material fixedly.

I claim:

1. A multifarious boring device comprising:
   a head having mounted in a face thereof a plurality of machining tools including a base tool, each said tool being mounted on said head at a respective separate position thereof, and each said tool being operable at the said respective separate position thereof;
   a work table spaced from said head and adapted to fixedly support a workpiece;
   computer means, including at least one memory, for computing a first distance and relative direction between a particular said tool and said base tool and a second distance and direction between said base tool and a desired working point on the workpiece;
   shifting means, operable connected to one of said head or said work table and controlled by said computer means, for shifting, in response to said first and second distances and directions, said one of said head or said work table relative to the other of said head or said work table, and thereby for aligning precisely said desired working point with said particular tool; and
   power means, operably connected to said tools and controlled by said computer means, for operating said particular tool at said respective separate position thereof, and without relative shifting of said respective positions of said tools with respect to said head, and thereby for performing a machining operation on the workpiece at said desired working point.

2. A device as claimed in claim 1, wherein said shifting means is operably connected to said work table for shifting said work table, and said head remains at a fixed position.

3. A device as claimed in claim 1, wherein said shifting means is operably connected to said head for shifting said head, and said work table remains at a fixed position.

4. A device as claimed in claim 1, wherein said tools are of the same type but have different diameters.

5. A device as claimed in claim 1, wherein said tools are of different type.

6. A device as claimed in claim 1, wherein said tools comprise drills having different diameters.

7. A device as claimed in claim 1, wherein said tools comprise punches having different diameters.

8. A device as claimed in claim 1, wherein said tools comprise screw taps having different diameters.

9. A device as claimed in claim 1, wherein said tools comprise dies having different shapes.

10. A device as claimed in claim 1, wherein said computer means comprises a minicomputer, microcomputer, calculator or other logic circuit.

* * * * *